United States Patent
Lee et al.

(10) Patent No.: US 8,791,991 B2
(45) Date of Patent: Jul. 29, 2014

(54) IMAGE DISPLAY DEVICE AND DRIVING METHOD THEREOF

(75) Inventors: Jeongki Lee, Gyeonggi-do (KR); Hyeonho Son, Gyeonggi-do (KR); Euitae Kim, Gyeonggi-do (KR); Joonyoung Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 565 days.

(21) Appl. No.: 12/962,779

(22) Filed: Dec. 8, 2010

(65) Prior Publication Data

US 2011/0273463 A1 Nov. 10, 2011

(30) Foreign Application Priority Data

May 7, 2010 (KR) ........................ 10-2010-0042975

(51) Int. Cl.
*G09G 5/10* (2006.01)
*G09G 5/36* (2006.01)
*G02B 27/22* (2006.01)

(52) U.S. Cl.
CPC ................................ *G02B 27/2264* (2013.01)
USPC .............................. 348/53; 345/545; 345/690

(58) Field of Classification Search
CPC .................................................. G02B 27/2264
See application file for complete search history.

(56) References Cited

U.S. PATENT DOCUMENTS

| | | | |
|---|---|---|---|
| 7,185,986 B2 * | 3/2007 | Taoka et al. ...................... | 353/31 |
| 7,465,053 B2 * | 12/2008 | Taoka et al. ...................... | 353/31 |
| 7,705,816 B2 * | 4/2010 | Chen et al. ....................... | 345/89 |
| 8,149,229 B2 | 4/2012 | Lee | |
| 8,259,050 B2 * | 9/2012 | Yun ................................. | 345/89 |
| 2002/0021261 A1 * | 2/2002 | Werner ............................ | 345/8 |
| 2002/0089485 A1 | 7/2002 | Youn | |
| 2005/0128584 A1 * | 6/2005 | Shulman et al. ............... | 359/462 |
| 2005/0162448 A1 | 7/2005 | Aoki | |
| 2005/0185275 A1 * | 8/2005 | Jang et al. ..................... | 359/465 |
| 2006/0274162 A1 * | 12/2006 | Fujishiro .................... | 348/229.1 |
| 2007/0085902 A1 * | 4/2007 | Walker et al. .................. | 348/51 |
| 2007/0236439 A1 * | 10/2007 | Chen et al. ...................... | 345/89 |

(Continued)

FOREIGN PATENT DOCUMENTS

CN 101222648 A 7/2008
CN 101409051 A 4/2009

OTHER PUBLICATIONS

German Office Action dated Oct. 9, 2012 for corresponding patent application No. 10 2010 060 858.0.

(Continued)

*Primary Examiner* — Christopher S Kelley
*Assistant Examiner* — Asmamaw G Tarko
(74) *Attorney, Agent, or Firm* — Morgan, Lewis & Bockius LLP

(57) ABSTRACT

The present application relates to method of driving an image display device comprising inserting a black data frame displaying black data between neighboring data frames alternately displaying left-eye data and right-eye data; comparing an nth frame corresponding to a current frame and an (n−2)th frame corresponding to a previous frame with each other when the data frames are input, reading a compensation value according to the comparison result from a lookup table and modulating input data of the nth frame using the read compensation value to output a modulated data; and bypassing data corresponding to the black data without modulating the data when the black data is input to output a bypass data, the application also relates to said image display device.

6 Claims, 7 Drawing Sheets

(56) References Cited

U.S. PATENT DOCUMENTS

| | | | |
|---|---|---|---|
| 2007/0236619 A1* | 10/2007 | Kuo | 349/15 |
| 2008/0013001 A1* | 1/2008 | Jang et al. | 349/15 |
| 2008/0094468 A1* | 4/2008 | Tseng et al. | 348/43 |
| 2008/0136990 A1* | 6/2008 | Kimura | 349/46 |
| 2008/0151040 A1* | 6/2008 | Kim | 348/42 |
| 2008/0252578 A1* | 10/2008 | Kim et al. | 345/87 |
| 2008/0259063 A1* | 10/2008 | Kim et al. | 345/204 |
| 2008/0284801 A1* | 11/2008 | Brigham et al. | 345/690 |
| 2009/0109247 A1* | 4/2009 | Kimura | 345/690 |
| 2009/0109282 A1* | 4/2009 | Schnebly et al. | 348/55 |
| 2009/0237495 A1* | 9/2009 | Kawahara | 348/56 |
| 2009/0273556 A1* | 11/2009 | Shimoshikiryoh et al. | 345/99 |
| 2009/0278918 A1* | 11/2009 | Marcus et al. | 348/54 |
| 2010/0033555 A1* | 2/2010 | Nagase et al. | 348/43 |
| 2010/0045640 A1* | 2/2010 | Park et al. | 345/205 |
| 2010/0066820 A1* | 3/2010 | Park et al. | 348/53 |
| 2011/0273439 A1* | 11/2011 | Son et al. | 345/419 |
| 2012/0013601 A1* | 1/2012 | Park et al. | 345/419 |
| 2012/0044333 A1* | 2/2012 | Kang | 348/56 |
| 2012/0086706 A1* | 4/2012 | Lee et al. | 345/419 |

OTHER PUBLICATIONS

The First Office Action from The State Intellectual Property Office of the People's Republic of China dated Jun. 6, 2013, in Chinese application 201010610156.3.

Examination Statement from the Taiwan Advance Patent & Trademark Office dated Jun. 7, 2013, in Taiwanese application 099144106.

* cited by examiner

127 − 127 − 127 − 191 − 191 − 191 − 63 − 63 − 63

0

(A) original data stream

127 − 127 − 127 − (223) − 191 − 191 − (31) − 63 − 63

0

(B) data stream to which ODC applied (A) 180 − 0 − 150

(B) 255 − 0 − 150

LUT1

| | Previous Frame (Fn-2) | | |
|---|---|---|---|
| | 0 | 127 | 255 |
| 0 Current Frame (Fn) 127 255 | | ODC values | |

FIG. 8

| Frame | 1F | 2F | 3F | 4F | 5F | 6F | 7F | 8F | |
|---|---|---|---|---|---|---|---|---|---|
| BDI | L | B | R | B | L | B | R | B | |
| change in frame polarity | + | − | + | − | + | − | + | − | 1 Frame Inversion |
| | + | + | − | − | + | + | − | − | 2 Frame Inversion |
| | + | + | + | + | − | − | − | − | 4 Frame Inversion |

IMAGE DISPLAY DEVICE AND DRIVING METHOD THEREOF

This application claims the benefit of Korea Patent Application No. 10-2010-0042975 filed on May 07, 2010, which is incorporated herein by reference for all purposes as if fully set forth herein.

BACKGROUND

1. Field of the Invention

This invention relates to an image display device and a driving method thereof for improving picture quality.

2. Related Art

With the advancement of various image processing techniques, image display systems capable of selectively displaying 2D images and 3D images are developed.

Methods of generating 3D images are classified into stereoscopic technique and autostereoscopic technique.

The stereoscopic technique uses disparity images of left and right eyes which have high 3D effect, and includes a stereoscopic method and an autostereoscopic method which are practically used. The autostereoscopic method provides an optical plate such as a parallax barrier for separating optical axes of left and right disparity images from each other in front of or behind a display screen. The stereoscopic method displays left and right disparity images having different polarization directions on a liquid crystal display panel and generates 3D images by using polarizing glasses or liquid crystal shutter glasses.

The stereoscopic method is further classified into a first polarizing filter method which uses a pattern retarder film and polarizing glasses, a second polarizing filter method which uses a switching liquid crystal layer and polarizing glasses, and a liquid crystal shutter glasses method. In the first and second polarizing filter methods, 3D images have low transmissivity due to the pattern retarder film or the switching liquid crystal layer which is arranged on a liquid crystal display panel to function as a polarizing filter.

The stereoscopic method which uses a liquid crystal shutter glasses alternately displays left-eye and right-eye images on a display frame by frame and then opens and closes left-eye and right-eye shutters of liquid crystal shutter glasses in synchronization with the display timing to generate a 3D image. The liquid crystal shutter glasses open only the left-eye shutter for an nth frame period in which a left-eye image is displayed and open only the right-eye shutter for an (n+1)th frame period in which a right-eye image is displayed to generate binocular disparity in a time division manner.

In the above image display systems, a liquid crystal display (LCD) is widely used as an image display device. The LCD, a hold-type display device, holds data charged in a previous frame right before new data is written because of the maintenance characteristic of liquid crystal. The response of liquid crystal is delayed when data is written. The response delay of liquid crystal causes motion blurring when a left-eye image is changed to a right-eye image or when a right-eye image is changed to a left-eye image while the LCD generates a 3D image, resulting in 3D crosstalk in the form of a ghost.

Various methods for improving the response characteristic of liquid crystal for 2D images are known. For example, Over Driving Control (ODC) compares previous frame data with current frame data, detects a data variation according to the comparison result, reads a compensation value corresponding to the data variation from a memory and modulates input data with the read compensation value. Referring to FIG. 1, the ODC modulates the current frame data into "223" larger than "191" when the previous frame data is "127" and the current frame data is "191" and modulates the current frame data into "31" smaller than "63" when the previous frame data is "191" and the current frame data is "63", thereby adjusting data voltages applied to liquid crystal so as to improve the response characteristic of liquid crystal. Besides, Black Data Insertion (BDI) inserts a black frame between neighboring frames to improve motion blurring and thereby enhance the response characteristic of liquid crystal.

To improve the 3D crosstalk occurred due to the overlapping of left eye images and right eye images caused by the brightness difference, it is considered to apply the above-described methods for improving the response characteristic of liquid crystal to image display devices.

However, there are some problems relating to a luminance deviation using the existing ODC logic and compensation values as shown in FIG. 2. In FIG. 2, an (n−2)th frame Fn−2 represents a left-eye data frame displaying a left-eye image, an nth frame Fn represents a right-eye data frame displaying a right-eye image, and an (n−1)th frame Fn−1 represents a black data frame displaying a black image. A variation in the luminance of the nth frame Fn to which the ODC is applied is generated between a case (A) where the target gray-scale values of each frame corresponds to "180", "0" and "150" respectively and a case (B) where the target gray-scale values of each frame corresponds to "255", "0" and "150", respectively. This is because liquid crystal rises due to the applied voltage such that the initial luminance Li of the nth frame Fn in the case (A) is different from the initial luminance Li of the nth frame Fn in the case (B) due to a response delay of liquid crystal even when the same compensation value is applied with reference to the target gray-scale value "0" of the (n−1)th frame Fn−1 in order to achieve the target gray-scale value "150" of the nth frame Fn. The response of liquid crystal is proportional to a gray-scale difference between the (n−2)th frame Fn−2 and the (n−1)th frame Fn−1, and thus the initial luminance Li in the case (B) is higher than the initial luminance Li in the case (A). Similar case will happen when a black data frame displaying a black image is inserted between an (n−2)th frame Fn−2 represents a left-eye data frame displaying a left-eye image and an nth frame Fn represents a right-eye data frame displaying a right-eye image.

SUMMARY

An aspect of this invention is to provide an image display device and a driving method thereof for removing 3D crosstalk without causing a luminance deviation when generating a 3D image A further aspect of this invention is to provide an image display device and a driving method thereof for remarkably reducing the DC image sticking.

In an aspect, a method of driving an image display device comprises inserting a black data frame displaying black data between neighboring data frames alternately displaying left-eye data and right-eye data; comparing an nth frame corresponding to a current frame and an (n−2)th frame corresponding to a previous frame with each other when the data frames are input, reading a compensation value according to the comparison result from a lookup table and modulating input data of the nth frame using the read compensation value to output a modulated input data; bypassing data corresponding to the black data without modulating the data when the black data is input to output a bypass data.

The method may further comprise inverting the polarities of the modulated data and the bypass data according to N frame inversion (N is a multiple of 4) and applying the data having the inverted polarities to a display panel.

The method may further comprise storing input data of the data frames for a period corresponding to two frames.

The method may further comprise opening a left-eye shutter of liquid crystal shutter glasses in synchronization with display timing of the left-eye data and opening a right-eye shutter of the liquid crystal shutter glasses in synchronization with display timing of the right-eye data.

In another aspect, an image display device comprises a 3D processor inserting a black data frame displaying black data between neighboring data frames alternately displaying left-eye data and right-eye data; a data modulator comparing an nth frame corresponding to a current frame and an (n−2)th frame corresponding to a previous frame with each other when the data frames are input, reading a compensation value according to the comparison result from a lookup table and modulating input data of the nth frame using the read compensation value to output a modulated data; and a bypass unit bypassing data corresponding to the black data without modulating the data when the black data is input to output a bypass data.

The image display device may further comprise a data driver inverting the polarities of the modulated data and the bypass data according to N frame inversion (N is a multiple of 4) and applying the data having the inverted polarities to a display panel.

The image display device may further comprise a frame memory storing input data of the data frames for a period corresponding to two frames.

The image display device may further comprise liquid crystal shutter glasses having a left-eye shutter opened in synchronization with display timing of the left-eye data and a right-eye shutter opened in synchronization with display timing of the right-eye data.

BRIEF DESCRIPTION OF THE DRAWINGS

The implementation of this invention will be described in detail with reference to the following drawings in which like numerals refer to like elements.

FIG. 8 illustrates data polarity control according to 4 frame inversion.

DETAILED DESCRIPTION

Hereinafter, an implementation of this invention will be described in detail with reference to FIGS. 3 through 8.

Figure 1:
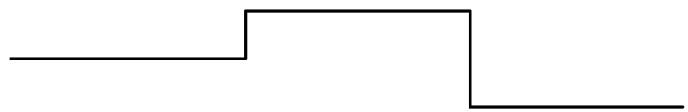
FIG. 1 is a view for explaining a conventional Over Driving Control (ODC) method.
Figure 1:
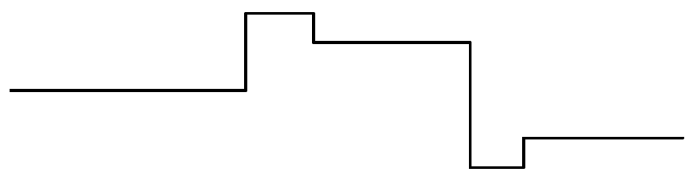
Figure 2:
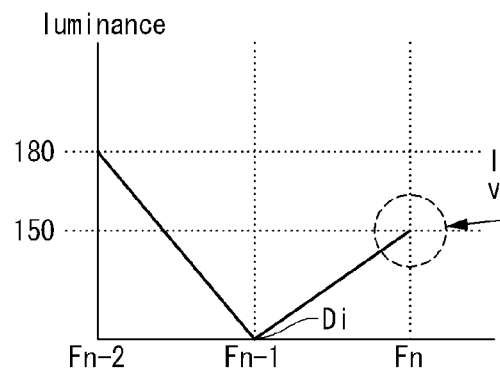
FIG. 2 illustrates a luminance deviation generated when a 3D image is produced.
Figure 2:
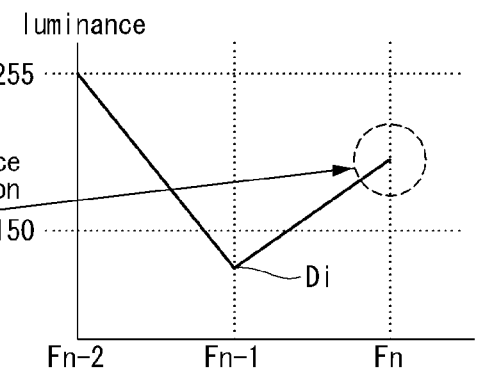
Figure 3:
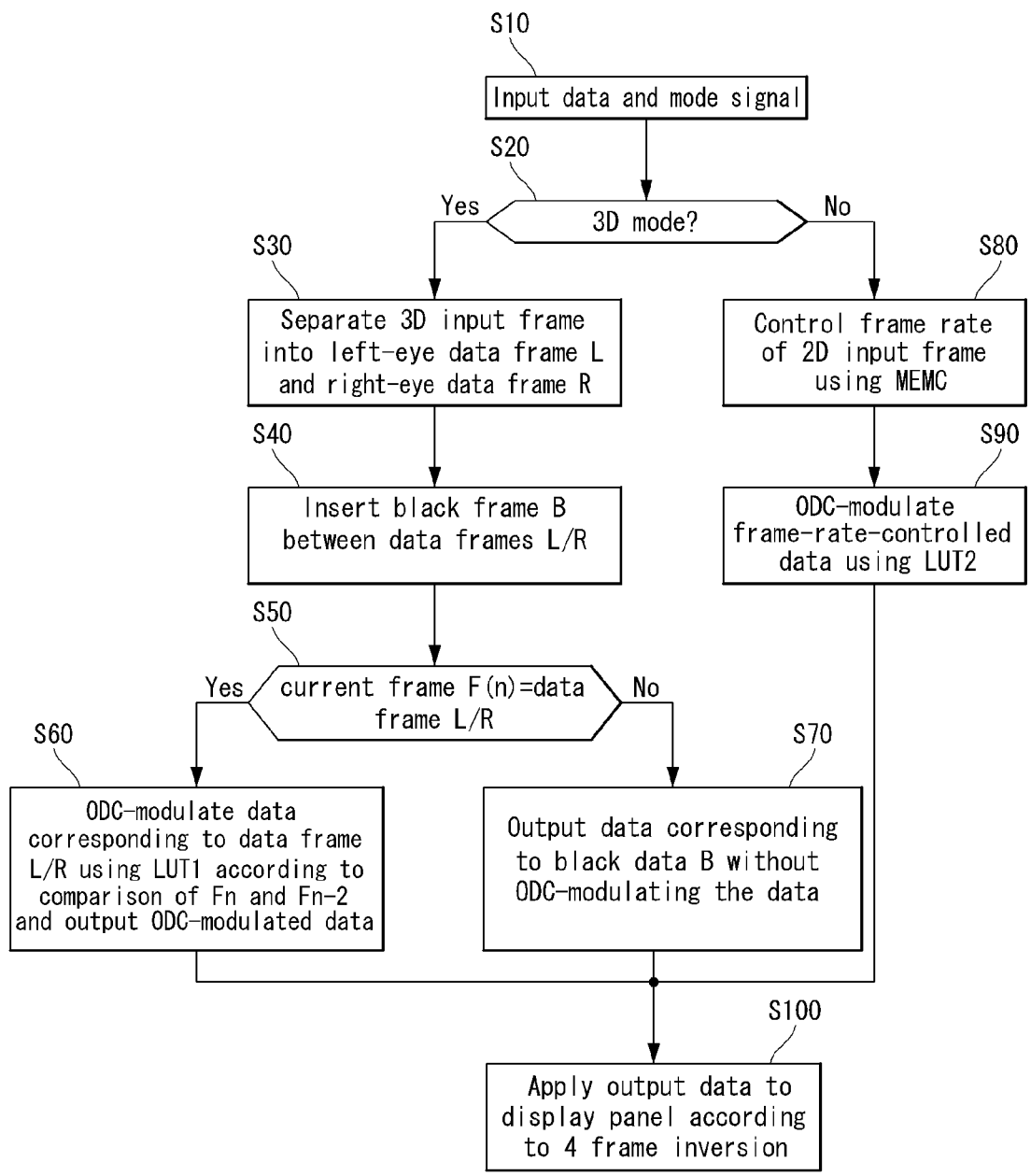
FIG. 3 is a flowchart showing an implementation of a method of driving an image display device.
Figures 4, 5:
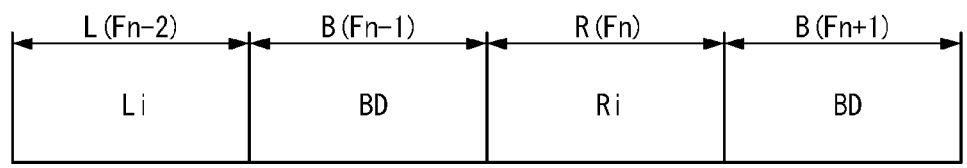
FIG. 4 illustrates insertion of a black data frame between data frames.
FIG. 5 illustrates an exemplary lookup table for comparing nth frame data and (n−2)th frame data with each other.

FIG. 3 is a flowchart showing an implementation of a method of driving an image display device, FIG. 4 illustrates insertion of a rest frame between data frames, and FIG. 5 illustrates an exemplary lookup table for comparing nth frame data and (n−2)th frame data with each other.

Referring to FIG. 3, it is determined whether a current driving mode is a 3D mode with reference to an input data and mode signal in operations S10 and S20.

When it is determined that the current driving mode is the 3D mode in operation S20, 3D input frames composed of 3D data input from an external video source are separated into left-eye data frames L for displaying left-eye images and right-eye data frames R for displaying right-eye images in operation S30. A black data frame for displaying a black image is inserted between neighboring data frames L and R, as shown in FIG. 4, in operation S40. An input frame frequency is thus multiplied by four through the aforementioned data separating and inserting operations. For example, a frame frequency of 50 Hz is multiplied to 200 Hz and a frame frequency of 60 Hz is multiplied to 240 Hz. Similarly, an input frame frequency can be multiplied by 4n in the similar way.

It is determined whether an nth frame Fn corresponding to a current frame is the data frame L or R or the black data frame B with reference to an input vertical synchronization signal in operation S50.

When it is determined that the nth frame Fn corresponds to the data frame L or R in operation S50, input data of the data frame L or R is ODC-modulated using compensation values included in the first lookup table LUT1 and output in operation S60. In the first lookup table LUT shown in FIG. 5, a previous frame with respect to the nth frame Fn is set to the (n−2)th frame Fn−2. The (n−2)th frame Fn−2 corresponds to the right-eye data frame R when the nth frame Fn is the left-eye data frame L or the (n−2)th frame Fn−2 corresponds to the left-eye data frame L when the nth frame Fn is the right-eye data frame R, and thus neighboring data frames L and R having the black data frame B arranged between them are compared with each other when ODC is applied. Accordingly, a luminance variation due to a response delay of liquid crystal is remarkably reduced as compared to a conventional method of driving an image display device.

When it is determined that the nth frame Fn is the black data frame B in operation S50, data of the black data frame B is output without being ODC-modulated in operation S70.

On the other hand, when it is determined that the current driving mode is a 2D mode in operation S20, a frame rate of 2D input frames composed of 2D data input from an external video source is controlled through a data interpolation method such as motion estimation motion compensation (MEMC) in operation S80. An input frame frequency is multiplied by four or more according to the frame rate control (FRC).

The frame-rate-controlled 2D data is ODC-modulated using compensation values included in a second lookup table LUT2 in operation S90. The ODC modulation method is identical to the modulation methods disclosed in Korean Patent Nos. 10-2001-0032364 and 10-2001-0057119 applied by the Applicant.

The polarity of the data output in operations S60, S70 and S90 is inverted through N frame inversion (N is a multiple of 4) as shown in FIG. 8 and the polarity-inverted data is applied to a liquid crystal display panel in operation S100.

Figure 6:
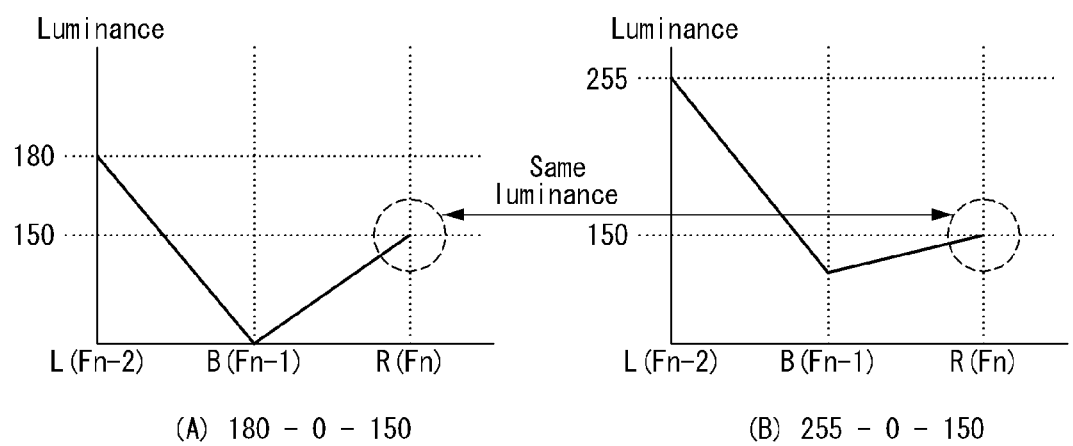
FIG. 6 is a view for explaining the effect of an implementation of the present invention.

FIG. 6 shows the effect of the driving method according to the present invention.

Referring to FIG. 6, when the (n−2)th and nth frames Fn−2 and Fn corresponding to left-eye and right-eye or right-eye and left-eye data frames are arranged having the (n−1)th frame Fn−1 corresponding to the black data frame located therebetween, the luminance in the nth frame Fn to which the ODC modulation is applied according to the present invention reaches "150" in both a case (A) where the target grayscale values of each frame corresponds to "180", "0" and "150" respectively and a case (B) where the target gray-scale values of each frame corresponds to "255", "0" and "150" respectively. The same luminance is achieved in the two cases (A) and (B) because the data of the nth frame Fn is ODC-modulated through comparison of the nth frame Fn with the (n−2)th frame Fn−2 and modulation by different compensation value based on the comparison result. The response of liquid crystal to the (n−1)th frame Fn−1 in the case (B) where the gray-scale value of the (n−2)th frame Fn−2 is relatively large is delayed as compared to the case (A). Thus an ODC compensation value can be determined according to the gray-scale value of the (n−2)th frame Fn−2 if the data of the nth frame Fn is ODC-modulated through comparison of the nth frame Fn with the (n−2)th frame Fn−2. In FIG. 6, the compensation value of (B) is determined to be smaller than the compensation value of (A) to remove a luminance variation.

Figure 7:
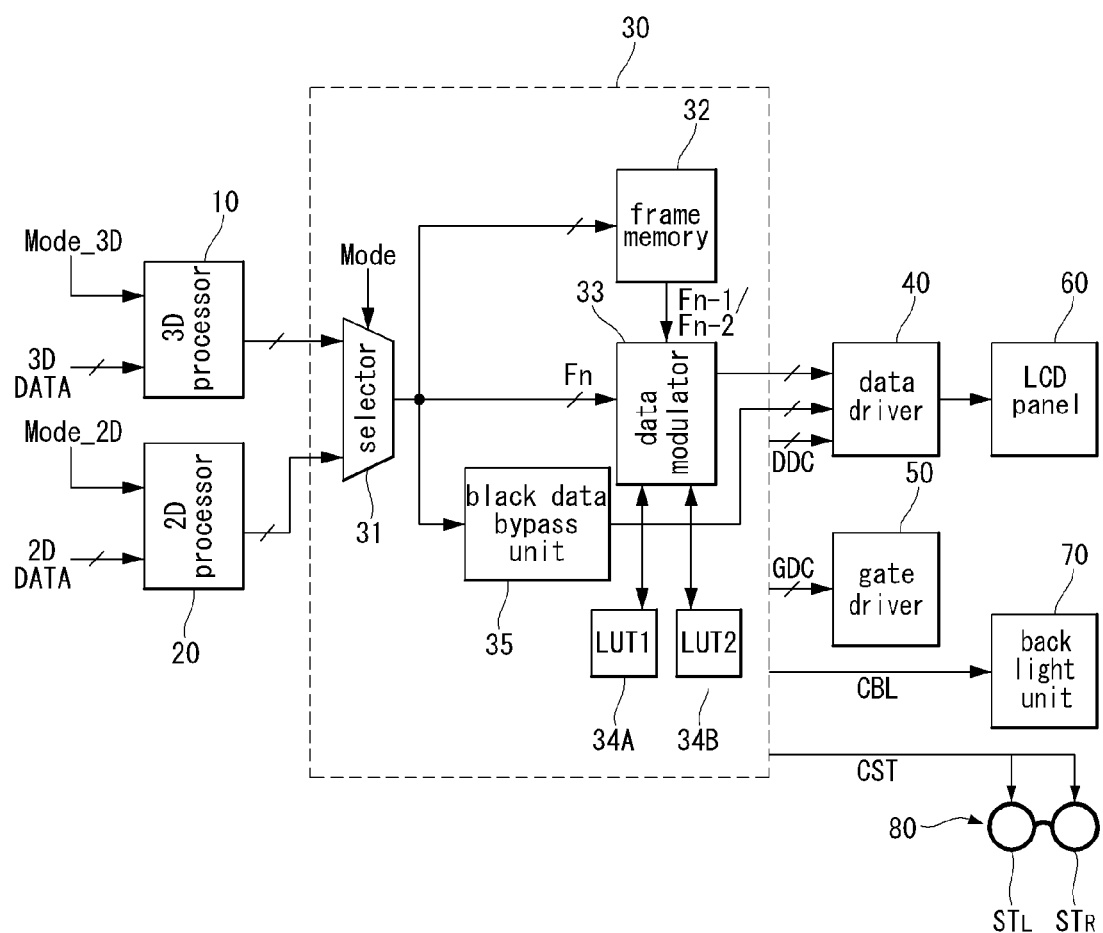
FIG. 7 is a block diagram of an implementation of an image display device.

FIG. 7 illustrates an implementation of an image display device according to the present invention.

Referring to FIG. 7, the image display device includes a 3D processor 10, a 2D processor 20, a timing controller 30, a data driver 40, a gate driver 50, a liquid crystal display (LCD) panel 60, a back light unit 70, and liquid crystal shutter glasses 80.

The 3D processor 10 separates 3D input frames composed of 3D data input from an external video source into left-eye data frames L for displaying left-eye images and right-eye data frames R for displaying right-eye images and inserts a black data frame for displaying a black image, that is, a black data frame B, between neighboring data frames to multiply an input frame frequency.

The 2D processor 20 controls the frame rate of 2D input frames composed of 2D data input from an external video source through data compensation such as MEMC to multiply an input frame frequency.

The timing controller 30 ODC-modulates the input 2D/3D data and provides the modulated data to the data driver 40 in synchronization with the multiplied input frame frequency. The timing controller 30 generates timing control signals DDC and GDC for controlling operation timing of the data driver 40 and the gate driver 50 based on timing signals (vertical synchronization signal, horizontal synchronization signal, data enable signal, dot clock signal, etc.) input from an external system board. The timing controller 30 multiples the data timing control signal DDC and the gate timing control signal GDC to synchronize the data timing control signal DDC and the gate timing control signal GDC with the multiplied input frame frequency. The timing controller 30 generates a back light control signal CBL for controlling tuning on/off timing of the back light unit 70 based on the multiplied input frame frequency. The timing controller 30 generates a shutter control signal CST for controlling the operation of the liquid crystal shutter glasses 80 based on the multiplied input frame frequency.

The timing controller 30 includes a selector 31 for selectively outputting input 2D and 3D data, a frame memory 32, a data modulator 33, first and second lookup tables 34A and 34B, and a black data bypass unit 35. The selector 31 selectively outputs the 2D data input from the 2D processor 20 and the 3D data input from the 3D processor 10 according to an external mode signal. The frame memory 32 stores the 3D data received from the selector 31 for a period corresponding to 2 frames in the 3D mode. The frame memory 32 stores only data of data frames L and R in the 3D mode. The frame memory 32 stores the 2D data received from the selector 31 for one frame period in the 2D mode. The first lookup table 34A stores compensation values selected through comparison of the nth frame Fn and the (n−2)th frame Fn−2. The second lookup table 34B stores compensation values selected through comparison of the nth frame Fn and the (n−1)th frame Fn−1. The compensation values of the first and second lookup tables 34A and 34B are loaded from an external EEPROM whenever the image display device is provided with power. Compensation values stored in the EEPROM may be updated by a user. The data modulator 33 receives the 3D data including the data frames L and R and the frame-rate-controlled 2D data from the selector 31. The data modulator 33 compares the nth frame Fn and the (n−2)th frame Fn−2 with each other, reads compensation values according to the comparison result from the first lookup table 34A and ODC-modulates data corresponding to the data frames L and R using the compensation values in the 3D mode. The data modulator 33 ODC-modulates the frame-rate-controlled 2D data using the compensation values included in the second lookup table 34B in the 2D mode. The black data bypass unit 35 bypasses the black data frame B received from the selector 31 to the data driver 40.

The data driver 40 converts the modulated 3D data or 2D data received from the timing controller 30 into an analog signal in response to the data control signal DDC, inverts the polarity of the modulated 3D data or 2D data through the N frame inversion (N is a multiple of 4) shown in FIG. 8 and provides the 3D data or 2D data having the inverted polarity to data lines of the LCD panel 60. The polarity of the data is inverted according to the N frame inversion in order to eliminate DC image sticking. A DC voltage is applied to an LCD for a long time, ions with negative charges are moved in the same motion vector direction and ions with positive charges are moved in a motion vector direction opposite to the moving direction of the ions with negative charges and polarized according to the polarity of a field applied to the liquid crystal. The quantity of accumulated ions with negative charges and the quantity of accumulated ions with positive charges increase with the lapse of time. As the quantities of accumulated ions increase, an alignment film is degraded so as to deteriorate the alignment characteristic of liquid crystal. Accordingly, when the DC voltage is applied to the LCD for a long time, image sticking is generated on a displayed image and becomes large with the lapse of time. The image sticking is rapidly generated and becomes severe when the temperature is high or the DC voltage is applied to a liquid crystal layer for a long time. The DC image sticking becomes serious when the polarity of data is inverted for every frame or for every two frames while applying BDI to the data in the 3D mode. As it can be known from FIG. 8, when the polarity of data is inverted according to 1 frame inversion, a data polarity corresponding to left-eye data frames L and a data polarity corresponding to right-eye data frames R are continuously maintained to be positive (+) so as to increase the DC image sticking. Furthermore, when the polarity of data is inverted according to 2 frame inversion, the data polarity corresponding to the left-eye data frames L is maintained to be positive (+) and the data polarity corresponding to the right-eye data frames R is maintained to be negative (−) to increase the DC image sticking. However, when the polarity of data is inverted according to 4 frame inversion, the data polarity corresponding to the left-eye data frames L and the data polarity corresponding to the right-eye data frames R are inverted for every four frames, and thus the DC image sticking is remarkably reduced.

The gate driver 50 generates a scan pulse signal in response to the gate control signal GDC and sequentially provides the scan pulse signal to gate lines of the LCD panel 60.

The LCD panel 60 includes two glass substrates and a liquid crystal layer formed between the two glass substrates. The data lines and the gate lines intersecting the data lines are formed on the lower glass substrate of the LCD panel 60. Liquid crystal cells are arranged in a matrix form in the LCD panel 60 according to the intersecting structure of the data lines and the gate lines. A black matrix, a color filter, and a common electrode of the liquid crystal cells are formed on the upper glass substrate of the LCD panel 60. The common electrode is formed on the upper glass substrate in a vertical field driving mode such as twisted nematic (TN) mode and vertical alignment (VA) mode and formed together with pixel electrodes on the lower glass substrate in a horizontal field driving mode such as in-plane switching (IPS) mode and fringe field switching (FFS) mode. Polarizers are respectively attached to the upper and lower glass substrates of the LCD panel 60 and an alignment film for setting a pretilt angle of liquid crystal is formed between the inner sides of the upper and lower glass substrates, which come into contact with the liquid crystal.

The back light unit 70 includes light sources turned on according to driving power supplied from a light source driver (not shown), a light guide (or diffuser), and optical sheets. The back light unit 80 may be of direct type or edge type. The light sources may include one or more than two of a hot cathode fluorescent lamp (HCFL), a cold cathode fluorescent lamp (CCFL), an external electrode fluorescent lamp (EEFL), and a light emitting diode (LED). The back light unit 70 may be omitted when the image display device is a reflective LCD.

The liquid crystal shutter glasses 80 operate in the 3D mode and include a left-eye shutter STL and a right-eye shutter STR which are electrically individually controlled. Each of the left-eye shutter STL and the right-eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates. The first transparent electrode is provided with a reference voltage and the second transparent electrode is provided with ON/OFF voltage. The left-eye shutter STL and the right-eye shutter STR transmit light from the LCD panel 70 when the ON voltage is supplied to the second transparent electrode and block the light from the LCD panel 60 when the OFF voltage is applied to the second transparent electrode.

As described above, the image display device and the driving method thereof according to the present invention can ODC-modulate data of the nth frame (left-eye/right-eye data frame) with reference to data of the (n−2)th frame (right-eye/left-eye data frame) such that the ODC compensation value of the nth frame can be easily controlled according to the grayscale value of the (n−2)th frame. Accordingly, 3D crosstalk can be effectively removed without generating a luminance deviation when a 3D image is generated.

Furthermore, the image display device and the driving method thereof according to the present invention can remarkably reduce DC image sticking when BDI is applied to 3D images by inverting the polarity of data according to N frame inversion (N is a multiple of 4).

What is claimed is:

1. A method of driving an image display device, comprising: inserting a black data frame displaying black data between neighboring data frames alternately displaying left-eye data and right-eye data; comparing an nth frame corresponding to one of left-eye data and right-eye data frame to an (n−2)th frame corresponding to the other one of left-eye data and right-eye data frame when the data frames are input, reading an Over Driving Control compensation value according to the comparison result of the nth frame and the (n−2)th frame from a lookup table and modulating input data of the nth frame using the read Over Driving Control compensation value to output a modulated data; bypassing data corresponding to the black data frame without modulating when the black data frame is input to output a bypass data; and inverting the polarities of the modulated data and the bypass data according to N frame inversion, wherein N is a multiple of 4, and applying the data having the inverted polarities to a display panel.

2. The method of claim 1, further comprising storing input data of the data frames for a period corresponding to two frames.

3. The method of claim 1, further comprising opening a left-eye shutter of liquid crystal shutter glasses in synchronization with display timing of the left-eye data and opening a right-eye shutter of the liquid crystal shutter glasses in synchronization with display timing of the right-eye data.

4. An image display device comprising: a 3D processor inserting a black data frame displaying black data between neighboring data frames alternately displaying left-eye data and right-eye data; a data modulator comparing an nth frame corresponding to one of left-eye data and right-eye data frame to an (n−2)th frame corresponding to the other one of left-eye data and fight-eye data frame when the data frames are input, reading an Over Driving Control compensation value according to the comparison result of the nth frame and the (n−2)th frame from a lookup table and modulating input data of the nth frame using the read Over Driving Control compensation value to output a modulated data; a bypass unit bypassing data corresponding to the black data frame without modulating when the black data frame is input to output a bypass data, and a data driver inverting the polarities of the modulated data and the bypass data according to N frame inversion, wherein N is a multiple of 4 and applying the data having the inverted polarities to a display panel.

5. The image display device of claim 4, further comprising a frame memory storing input data of the data frames for a period corresponding to two frames.

6. The image display device of claim 4, further comprising liquid crystal shutter glasses having a left-eye shutter opened in synchronization with display timing of the left-eye data and a right-eye shutter opened in synchronization with display timing of the right-eye data.

* * * * *